Oct. 11, 1949.　　　J. LE VALLEY　　　2,484,102
VALVE SEAT
Filed Aug. 21, 1946

INVENTOR
John LeValley
BY
HIS ATTORNEY.

Patented Oct. 11, 1949

2,484,102

UNITED STATES PATENT OFFICE 2,484,102

VALVE SEAT

John Le Valley, Painted Post, N. Y., assignor to Ingersoll-Rand Company, New York, N. Y., a corporation of New Jersey Application August 21, 1946, Serial No. 691,909

1 Claim. (Cl. 251—167)

This invention relates to valve mechanism, and more particularly to a valve seat for an axially movable valve.

One object of the invention is to obviate the chances of leakage of fluid between the channels controlled by the valve.

Another object is to obviate the need of costly and precise machining of the valve parts in order to prevent leakage therebetween.

Other objects will be in part obvious and in part pointed out hereinafter.

Figure 1:
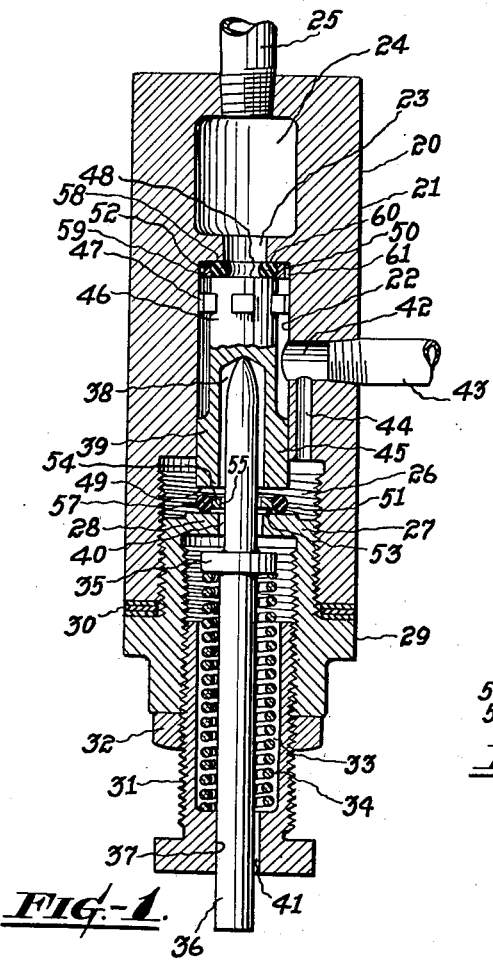
Figure 2:
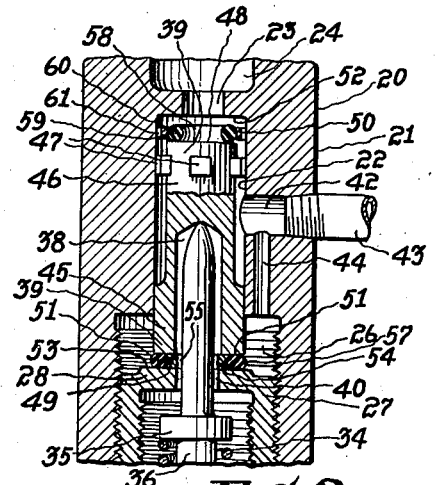
Figure 3:
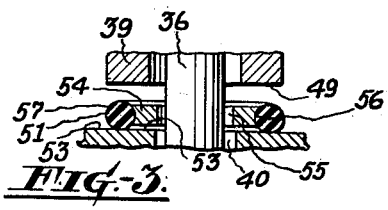
Figure 4:
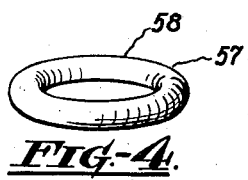
Figure 5:
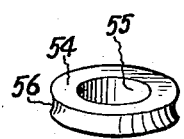
Figure 6:
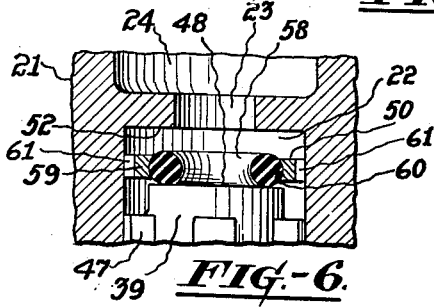
Figure 7:
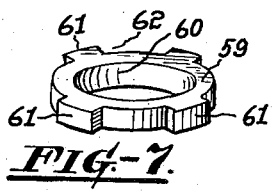

In the drawings accompanying this specification and in which similar reference numerals refer to similar parts, Figure 1 is an elevation, partly broken away, of a valve mechanism equipped with a valve seat constructed in accordance with the practice of the invention and showing the valve in one limiting position, Figure 2 is a similar view showing the valve in another limiting position, Figure 3 is an elevation, partly in section, of one form that the valve seat may assume in practice and fragmentary portions of parts wherewith it is associated, Figures 4 and 5 are perspective views of the constituent parts of the valve seat shown in Figure 3, Figure 6 is a view similar to Figure 3 showing another form of valve seat, and Figure 7 is a perspective view of a detail of the valve seat shown in Figure 6.

Referring more particularly to the drawings, 20 designates a valve mechanism shown for the purpose of illustration as being of the type forming the subject matter of the United States Patent No. 1,806,301 to John LeValley and, as explained in the aforesaid patent, intended more particularly to control the flow of pressure fluid to and from the load-controlling devices of a compressor (not shown).

The valve mechanism accordingly comprises a casing 21 having a valve chamber 22 communicating through a port 23 with a supply chamber 24 that is in constant communication with the storage receiver (not shown), of a compressor, through a conduit 25. In the opposite end of the casing 21 is an enlarged bore 26 that communicates with the adjacent end of the valve chamber 22 and is threaded for the accommodation of a hollow plug 27 having an end wall 28 that constitutes a bounding surface for the bore 26. The plug 27 has an external flange 29 between which and the end of the casing 21 are shims 30 that may be removed or increased in number for varying the distance between the wall 28 and the opposed end of the valve chamber 22.

The plug 27 is threaded internally to receive an externally threaded plug 31 that is locked in adjusted position by a lock nut 32. The plug 31 has a cavity 33 for the accommodation of a compression spring 34 interposed between the bottom of the cavity 33 and a flange 35 on a plunger 36 in a bore 37 in the outer end of the plug 31 and extending upwardly into a recess 38 in a valve 39 reciprocable in the valve chamber 22. The plunger 36 extends through an opening or port 40 in the end wall 28 and its upper end is pressed against the bottom of the recess 38 by the spring 34 for holding the valve normally in position to prevent the flow of pressure fluid from the port 23 into the valve chamber 22.

An exhaust passage 41 in the end of the plug 31 affords constant communication between the interiors of the plugs 31—27 with the atmosphere, and in the casing 21 is a port 42 that opens into the intermediate portion of the valve chamber 22 and into a conduit 43 serving to convey pressure fluid to and from the devices intended to be controlled. The port 42 is also in constant communication with the bore 26 through a passage 44.

The valve 39 is of the reciprocatory type having a head 45 at one end slidable in the valve chamber 22 and a reduced stem portion 46 having lugs 47 that slide on the wall of the valve chamber 22 to assist in guiding the valve. The upper and lower end surfaces 48 and 49 of the valve respectively control communication between the valve chamber 22 and the port 23 and between the bore 26 and the port 40. They are perpendicular to the axis of the valve and in the limiting positions of the valve engage valve seats 50 and 51 interposed, respectively, between the surface 48 and the rear end surface 52 of the valve chamber and between the surface 49 and a seating surface 53 on the outer side of the wall 28.

The valve seats 50 and 51 have complete freedom of movement axially, and the valve seat 51 comprises a plate 54 having a hole 55 to receive loosely the plunger 36 and to afford communication between the bore 26 and the port 40. The diameter of the hole 55 is considerably larger than that of the plunger 36 to permit the valve seat 51 to tilt or move transversely with respect to the surrounding parts. In the periphery of the plate 54 is an annular groove 56 for the accommodation of a sealing ring 57 that has its transverse median line coincident with that of the plate 54 and cooperates with the surfaces 49 and 53 to cut-off communication between the bore 26 and the port 40. The sealing ring 57 is shown as being of a well known type made of rubber, or rubber composition, and of circular cross section the diameter of which is greater than the thickness of the plate so that opposed sides of the sealing ring extend beyond the sides of the plate 54. Owing to this arrangement, the sealing ring 57 will be compressed in a sufficient degree to assure fluid tight joints with the surfaces 49 and 53, and the plate 54, being a rigid member, will prevent the undue distortion of the sealing ring.

The valve seat 50 also comprises a sealing ring 58, similar to the ring 57 and interlockingly connected with a plate 59 serving to limit the degree of compression of the sealing ring by the valve 39, the plate 59, like the plate 54, being of less thickness than the cross sectional diameter of the ring 58. The ring 58 is of sufficiently larger diameter than the port 23 to assure an ample area of sealing engagement between the ring and the surface 52, around the port 23, and lies in an annular groove 60 within the plate 59.

On the periphery of the plate are guide lugs 61 that slidably engage the surface of the valve chamber 22 to maintain the valve seat 50 in parallelism with the surfaces 48 and 52 and to define spaces 62 for the passage of pressure fluid from the end of the valve chamber 22 to the port 42.

As will be readily appreciated, a valve seat, such as that designated 50, having the ring 58 within the plate 59 is particularly suitable for use around an inlet port since then the pressure of the fluid will force the sealing ring firmly into engagement with the plate. The valve seat 51, on the other hand, is more particularly suited for use on the pressure side of an exhaust port since in such case the pressure of the fluid tends to press the ring firmly into sealing engagement with the plate 54.

In practice, when the valve 39 is shifted to a limiting position, say downwardly by the pressure fluid acting against the surface 48 of the valve for supplying pressure fluid to the conduit 43 to operate the loading devices of a compressor, the sealing ring 57 is compressed between the valve 39 and the surface 53 until its upper and lower surfaces lie flush with the end surfaces of the plate 54. The plate itself will then be clamped between the valve and the surface 53 and will thus limit the downward stroke of the valve. The distortion of the ring 57 effected in this manner will provide ample areas of engagement between the ring 57 and the surfaces 49 and 53 to prevent the leakage of fluid from the bore 26 to the port 40.

In like manner, when the valve 39 is actuated upwardly by the spring 34 and the plunger 36, as when the pressure in the storage receiver of a compressor drops below the value exerted by the spring 34, the upward movement of the valve will be limited by the plate 59 which will then be clamped between the valve and the surface 52 and the ring 58 will be compressed in sufficient degree to effect adequate sealing areas around the port 23 and on the end of the valve.

By thus forming the seats for the valve as separate members which are free to tilt and move axially and transversely in relation to sealing surfaces on the valve and its casing, the valve seats may move either with the valve or remain on the sealing surfaces on the casing, depending upon whether they adhere to one or the other, as is sometimes the case in devices where the valve is required to remain in a given limiting position for extended periods of time, and in all cases free communication will be established, either through or around the valve seats, between the chambers and passages controlled by the valve. Moreover, owing to the use of valve seats of the type shown, the need of the costly operations of providing precisely ground seating surfaces on the valve and its abutments will be entirely eliminated since the sealing rings will adjust themselves readily to any slight imperfections that may be present at these important points.

I claim:

The combination with a valve mechanism including, a valve chamber and a port for the valve chamber, a seating surface encircling the port, a valve in the valve chamber movable axially to control communication between the valve chamber and the port, of an elastic sealing ring of circular cross section to effect a seal on the seating surface and on the opposed surface of the valve and being free to tilt and to move axially and transversely with respect to the valve and the seating surface, and a plate secured to the sealing ring for movement as a unit therewith and having a passage therethrough for the fluid medium controlled by the valve, said plate being of less thickness than the sealing ring and having its transverse median line coincident with that of the sealing ring to permit of the partial compression of the sealing ring on both sides of said plate.

JOHN LE VALLEY.

REFERENCES CITED

The following references are of record in the file of this patent:

UNITED STATES PATENTS

| Number | Name | Date |
|---|---|---|
| 1,793,850 | Halstead | Feb. 24, 1931 |
| 1,806,301 | LeValley | May 19, 1931 |
| 2,417,494 | Hoof | Mar. 8, 1947 |